US009227286B2

(12) United States Patent  
Sakai (10) Patent No.: US 9,227,286 B2  
(45) Date of Patent: Jan. 5, 2016

(54) PRECISION FEEDING DEVICE AND PRECISION TRANSFER EQUIPMENT

(75) Inventor: Hisayoshi Sakai, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 588 days.

(21) Appl. No.: 13/613,157

(22) Filed: Sep. 13, 2012

(65) Prior Publication Data

US 2013/0068051 A1   Mar. 21, 2013

(30) Foreign Application Priority Data

Sep. 20, 2011   (JP) .................................. 2011-205381

(51) Int. Cl.
| | |
|---|---|
| B23Q 17/00 | (2006.01) |
| B23Q 17/24 | (2006.01) |
| B23Q 5/38 | (2006.01) |
| B23Q 17/22 | (2006.01) |
| G01B 21/04 | (2006.01) |

(52) U.S. Cl.
CPC .............. *B23Q 17/2495* (2013.01); *B23Q 5/38* (2013.01); *B23Q 17/22* (2013.01); *G01B 21/047* (2013.01); *Y10T 74/18568* (2015.01)

(58) Field of Classification Search
CPC .......... F16H 21/16; B23Q 17/24; B23Q 5/38; B23Q 17/22; B23Q 17/2495; G01B 21/047
See application file for complete search history.

(56) References Cited

U.S. PATENT DOCUMENTS 5,940,180 A   8/1999   Ostby

FOREIGN PATENT DOCUMENTS

| | | |
|---|---|---|
| DE | 19617880 | 10/1996 |
| DE | 20023029 | 11/2002 |
| JP | 59-185151 | 10/1984 |
| JP | 2000-55617 A | 2/2000 |
| JP | 2006-205292 A | 8/2006 |
| WO | 2008/065683 | 6/2008 |

OTHER PUBLICATIONS

Search report from E.P.O., mail date is Feb. 7, 2013.
U.S. Appl. No. 13/612,972 to Hisayoshi Sakai, filed Sep. 13, 2012.
U.S. Appl. No. 13/613,706 to Hisayoshi Sakai, filed Sep. 13, 2012.

*Primary Examiner* — William C Joyce
(74) *Attorney, Agent, or Firm* — Greenblum & Bernstein, P.L.C.

(57) ABSTRACT

A precision feeding device that drives a table supported by a base in a predetermined moving direction includes: a rod connected to the table; a drive mechanism that drives to move the rod forward and backward in the moving direction; and a laser interferometer that detects a displacement of the rod relative to the base. The drive mechanism includes a linear motor that symmetrically applies a drive force on the rod relative to an axis in the moving direction. A laser path of the laser interferometer passes through the rod and extends in the moving direction, so that a moving axis of the rod, a thrust axis of the drive mechanism and a detection axis of the laser interferometer are aligned.

5 Claims, 5 Drawing Sheets

PRECISION FEEDING DEVICE AND PRECISION TRANSFER EQUIPMENT

The entire disclosure of Japanese Patent Application No. 2011-205381 filed Sep. 20, 2011 is expressly incorporated by reference herein.

BACKGROUND OF THE INVENTION

1. Field of the Invention

The present invention relates to a precision feeding device and precision transfer equipment, more specifically, to a device that transfers a work table or a column of measuring equipment, a machine tool or the like with a high precision for positioning.

2. Description of Related Art

In precision transfer equipment requiring a high motion accuracy (e.g., a precision positioning system, precision measuring equipment and a machine tool), an object to be moved (e.g. a work table, spindle column) is required to be moved with a high geometrical motion accuracy and, in addition, a position in a linear moving direction has to be accurately detected and controlled.

In detecting and controlling the position of the object to be moved, it is desirable that the precision transfer equipment mechanically satisfies the Abbe's principle. Specifically, it is desirable that a detection axis for identifying the position of the object passes through a point of action for a measurement or processing performed by moving the object. In addition, it is desirable that both a drive axis (or thrust axis) and a guide axis pass through a center of gravity of the object in order to control the movement and positioning of the object, and these drive (or thrust) and guidance axes coincide with the detection axis.

In a conventional drive mechanism of precision transfer equipment, a transmission mechanism such as a ball screw, friction drive, belt drive and rack-and-pinion is used (see Patent Literature 1: JP-A-2006-205292 and Patent Literature 2: JP-A-2000-55617).

In the equipment disclosed in Patent Literature 1, a transmission mechanism in a form of a drive roller is used in driving an object to be moved (e.g. a table) by a drive mechanism, in which the drive roller is frictionally rolled on a rod (driving body) to apply a drive force. In this device, a follower roller that receives a pressing force of the drive roller is disposed on an opposite side of the rod. However, the drive force is applied only on the side of the drive roller.

In the equipment disclosed in Patent Literature 1, a fluid static pressure joint is used for connecting the rod and the table. Especially, a supplying-discharging static-pressure bearing or a vacuum-balanced static-pressure air bearing can provide a strong rigidity in a compression direction and a tensile direction. Thus, there has been proposed to use a drive mechanism using the static-pressure bearing having such a high rigidity to increase geometric accuracy of motion of a high precision linear moving table.

The static-pressure joint disclosed in Patent Literature 1 includes a thrust plate that is supported near the rod by a gimbal mechanism absorbing a motion error in a yawing direction and is supported near the table by a similar gimbal mechanism absorbing a motion error in a pitching direction. Through the joint, forces other than the force in the moving direction of the table are not transmitted.

In a device according to Patent Literature 2, a slider driving mechanism using a feed screw shaft is provided under a table and the table is horizontally moved by the feed screw shaft.

A position detecting mechanism using a laser interferometer is provided on a side of the table of the device of Patent Literature 2. In this arrangement, a laser path extending from a light source of the laser interferometer to an end of the table is surrounded by a stretchable tube with a bellows, in which an inner pressure of the tube is reduced to eliminate an influence from air turbulence in the laser path, thereby achieving further high precision.

With the use of the laser interferometer, it is possible to acquire a high geometric accuracy of motion of the drive mechanism and the movable body and accurately detect and control the position of the movable body in a feed direction.

However, the above-described Patent Literatures 1 and 2 respectively use a frictional drive roller and a ball feed screw drive, where a moving axis (i.e. a direction for a moving component of the drive mechanism to be guided) and a thrust axis (i.e. a direction in which a drive force is applied) of the drive mechanism do not necessarily coincide and consequently an offset arises.

On the other hand, it is extremely difficult in terms of design to coincide the moving axis and thrust axis and pass through a gravity center of the object, to dispose the detection axis so that the detection axis passes through a point of action for measurement or processing, and to coincide all of the moving axis, thrust axis and detection axis.

If Abbe's principle is not satisfied and an influence of an offset is not negligible in such a device, supposing that the positioning of the drive mechanism has high repeatability, an additional step for calibration or correction using the third independent position measuring instrument (e.g. length measuring instrument with laser interferometer) that serves as an upper standard has to be conducted for an action point of a measurement and processing performed by driving the object to be moved, thus causing complication of device structure, decrease in serviceability and increase in production cost.

The above occurs not only in precision transfer equipment including a movable body such as a table but also in a device for driving the movable body (i.e. precision feeding device that does not include an object to be moved).

SUMMARY OF THE INVENTION

An object of the invention is to provide a precision feeding device and precision transfer equipment that allow a highly precise movement and a highly precise positioning based on a highly precise position detection.

A precision feeding device according to the invention is a precision feeding device that drives a movable body in a predetermined moving direction, the movable body being supported by a base and movable in the moving direction, the precision feeding device including:

a driving body that is connected to the movable body; a drive mechanism that drives to move the driving body forward and backward in the moving direction; and a displacement detector that detects a displacement of the movable body relative to the base, in which the drive mechanism includes a drive source that symmetrically applies a drive force on the driving body relative to an axis of the driving body in the moving direction, and the displacement detector is a laser interferometer that comprises a laser path penetrating the driving body and extending in the moving direction.

A precision transfer equipment according to another aspect of the invention includes: a base; a movable body that is supported by the base and is movable in a predetermined moving direction; a driving body that is connected to the movable body; a drive mechanism that drives to move the driving body forward and backward in the moving direction; and a displacement detector that detects a displacement of the movable body relative to the base, in which the drive mechanism includes a drive source that symmetrically applies a drive force on the driving body relative to an axis of the driving body in the moving direction, and the displacement detector is a laser interferometer that includes a laser path penetrating the driving body and extending in the moving direction.

With this arrangement, the movable body is moved by the drive mechanism via the driving body in the predetermined moving direction. The drive force from the drive mechanism is symmetrical (line-symmetrical or point-symmetrical in an orthogonal plane) relative to the axis of the driving body in the moving direction. Consequently, a thrust axis (i.e. axis of the drive force) and the moving axis of the driving body can be aligned.

Further, by disposing the laser path of the displacement detector to pass through the driving body, the detection axis of the laser interferometer can be coaxially aligned with the moving axis and the thrust axis of the drive mechanism.

Specific arrangement for symmetrically applying the drive force relative to the moving axis of the driving body may exemplarily be as follows.

In the above aspect of the invention, the drive source is preferably a linear motor including a movable member provided on the driving body and at least a pair of stators opposed with the driving body interposed therebetween.

In this arrangement, one of the movable member and the stator of the linear motor may be an armature such as an induction coil and the other may be a magnet for generating a magnetic field. Normally, the movable member (i.e. a member adapted to be moved) may be provided by a magnet and the stator may be provided by an induction coil.

With the above arrangement, the movable member provided on the driving body is driven by a thrust received from the stator provided on the driving body with the driving body being interposed. At this time, by oppositely disposing the at least a pair of the stators, the thrust applied from the respective stators to the movable member is combined to define the thrust axis passing through the center of the driving body, thereby aligning the thrust axis and the moving axis.

In the above aspect of the invention, the stator is preferably provided around the circumference of the driving body in a tubular shape.

With the above arrangement, uniform drive force is applied from the surroundings of the driving body and the thrust axis of the composite drive force can be easily aligned with the moving axis of the driving body at the center.

In the above arrangement, a plurality of lines of stators may be arranged along the circumference of the driving body or, alternatively, a plurality of annular stators provided around the driving body may be arranged along the moving axis.

With the use of the linear motor, the following advantages can be obtained.

Specifically, in a drive mechanism and transmission mechanism such as a roller and a ball screw mentioned in the "Description of Related Art", a non-linear load fluctuation may occur on account of friction, lost motion or rolling contact. In order to eliminate the load fluctuation, restraining an overshoot in acceleration or deceleration of driving or special control process such as gain scheduling for stably and accurately controlling the position is necessary.

In contrast, since a linear motor is an actuator in which a stator and a movable member are basically not in contact, non-linear component such as friction and lost motion in the above-described conventional transmission mechanism can be eliminated.

Incidentally, a linear motor is widely used for a highly precision feeding device in semiconductor manufacturing equipment and the like. However, there is no arrangement for coaxially aligning all of the moving axis, thrust axis and detection axis in the existing precision feeding device, which is unique to the above aspect of the invention.

The linear motor as a drive source of the above aspect of the invention may favorably be disposed in a tube as described above. However, any structure with a pair of linear motors opposed with the driving body being interposed is favorably used because the thrust axes of respective drive forces can be aligned with the center of the driving body, so that the structure can be simplified and equipment cost can be reduced. Thus, in implementing the invention, the structure and location of the linear motor may be appropriately selected in accordance with the required accuracy and the like.

In the above aspect of the invention, the drive source may be a pair of drive rollers disposed with the driving body interposed therebetween.

With the above arrangement, though the drive force cannot be transmitted in a non-contact manner as in a linear motor, by synchronously rotating the pair of drive rollers symmetrically disposed relative to the driving body, symmetrical drive force can be applied to the driving body and the moving axis and the thrust axis can be aligned.

Further, with the use of a pair of drive rollers, an extremely simple structure as compared to the linear motor is possible and equipment cost can be significantly reduced. Thus, by employing the arrangement in accordance with intended use, sufficient accuracy due to alignment of respective axes can be obtained.

In the above aspect of the invention, a guide mechanism that supports the driving body so that the driving body is movable along the moving direction is preferably provided.

With this arrangement, when a non-contact linear motor is used as the drive mechanism, the driving body can be supported by the guide mechanism.

The guide mechanism of the above arrangement determines the movement direction (guide axis) of the supported driving body. Accordingly, the orientation of the guide mechanism is preferably precisely adjusted and the guide mechanism, which may be formed in a tubular or annular shape surrounding the driving body, preferably adjusts the guide axis to be coaxially aligned with the moving axis required for the driving body.

In the above aspect of the invention, the driving body preferably includes a closed end near a connection with the movable body and a reflection surface orthogonal to the laser path inside the closed end.

It is only required for the reflection surface to properly reflect the laser beam from the laser interferometer. In addition to a highly accurate smooth surface, a retroreflective reflector such as a corner cube may be used.

With the above arrangement, the laser beam sent from the laser interferometer to the laser path within the driving body is reflected by the reflection surface to be returned to the laser interferometer, so that the moving axis and the thrust axis of the driving body can be aligned with the detection axis.

At this time, since the end of the driving body is closed, the laser path can be made highly vacuum. Further, since the laser path terminates at the end of the driving body, any joint or connector can be provided ahead of the end of the driving body and can be used for the connection between the driving body and the movable body.

In the above aspect of the invention, a joint that connects the movable body and the driving body is preferably provided, in which the joint is provided by a supplying-discharging static-pressure joint and includes: a movement surface that is connected to the movable body in a manner orthogonal to the moving direction; a drive surface that is connected to the driving body in a manner to face the movement surface; a fluid supply channel that guides a pressurized fluid into a static-pressure clearance formed between the movement surface and the drive surface; and a fluid discharge channel that is connected with a negative pressure source and discharges the fluid from the static-pressure clearance, and a laser light going through the laser path preferably passes through the driving body and the drive surface and is reflected by the movement surface.

With this arrangement, when the drive mechanism drives the driving body, the movable body is moved via the driving body and the joint. When a supplying-discharging static-pressure joint is used as the joint, influences of vibration from the driving source is avoided and a highly precise movement is conducted by driving only in the moving direction.

The movement of the movable body is detected by a displacement detector. Since the displacement detector exhibits a high precision with the use of the laser interferometer and avoids an off-set error owing to the laser path penetrating the driving body, the displacement detector can improve a positioning accuracy of the movable body.

It should be understood that, as the fluid used in the supplying-discharging static-pressure joint, not only air and other gases but also various oils and other liquids are applicable. With the use of air, however, air is easily available and causes no problem in case air is leaked.

DESCRIPTION OF EMBODIMENT(S)

Exemplary embodiments of the invention will be described below with reference to the attached drawings.
First Exemplary Embodiment
FIGS. 1 and 2 show a first exemplary embodiment of the invention.

Figure 1:
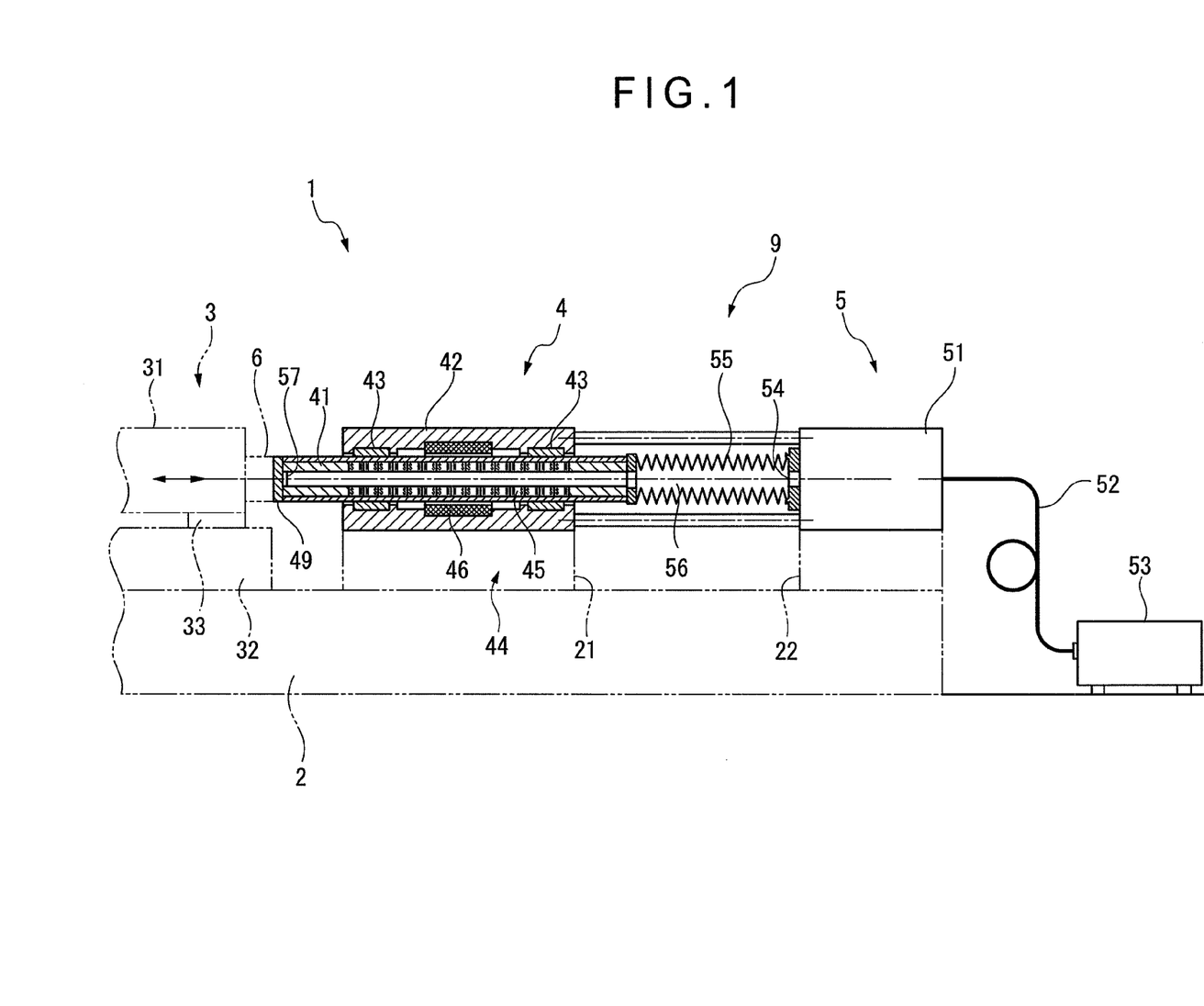
FIG. 1 is a schematic view showing an overall structure according to a first exemplary embodiment of the invention.
Figure 2:
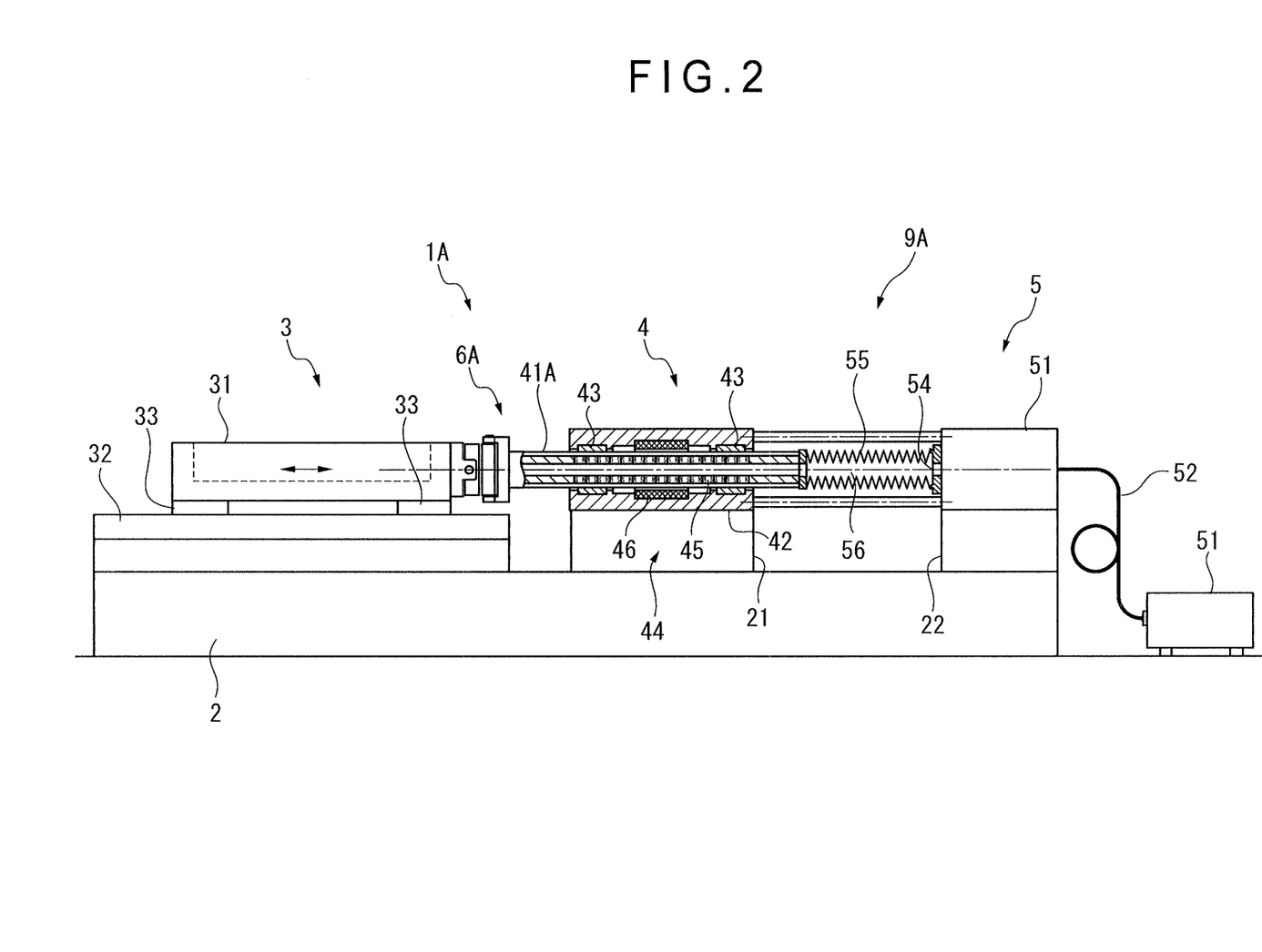
FIG. 2 is a schematic view showing an overall structure according to a second exemplary embodiment of the invention.

In FIG. 1, precision transfer equipment 1 according to the first exemplary embodiment includes: a base 2; and a table mechanism 3, a drive mechanism 4 and a laser interferometer 5 provided on the base 2.

The base 2 is fixed on a stable foundation while an upper surface of the base 2 is formed horizontally. The drive mechanism 4 and the laser interferometer 5 are supported on the base 2 via support bases 21 and 22 so that the height of the drive mechanism 4 and the laser interferometer 5 matches with the height of the table mechanism 3. The drive mechanism 4 and the laser interferometer 5 provide a precision feeding device 9 of the first exemplary embodiment.

The table mechanism 3 supports a table 31 (a movable body) and includes a guide rail 32 that is fixed on the base 2.

A guide bearing 33 is provided on a bottom surface of the table 31. The table 31 is supported by the base 2 through the guide bearing 33 and the guide rail 32.

The guide rail 32 is continuously formed in a predetermined moving direction (in a predetermined direction for moving the table 31) while an upper surface of the guide rail 32 is made horizontal, flat and smooth.

The guide bearing 33 is a static-pressure air bearing that forms a static-pressure clearance between the upper surface of the guide rail 32 and the guide bearing 33 by supplying compressed air, and is preloaded with a load of the table 31.

The table 31 is movably supported by the table mechanism 3 and is smoothly movable in the above moving direction.

The drive mechanism 4 drives a rod 41 (a driving body) and includes a casing 42 that is fixed on the base 2 and a linear motor 44 (a drive source).

The rod 41 is a hollow elongated tubular member that extends in the moving direction of the table 31. Both ends of the rod 41 (a base end on the right and a tip end on the left in FIG. 1) project beyond the casing 42. The tip end of the rod 41 is connected to the table 31 via a joint 6.

The casing 42 includes a rod guide 43 through which the rod 41 is introduced and which smoothly and slidably receives a circumference of the rod 41, the rod guide 43 being provided at two positions. By being supported by the rod guides 43, the rod 41 is kept supported in the moving direction of the table 31 and is freely movable in a longitudinal direction of the rod 41. These rod guides 43 provide a guide mechanism.

The linear motor 44 includes a magnet 45 (a movable member) provided to the rod 41 and an induction coil 46 (a stator) provided to the casing 42.

The magnet 45 is provided by a plurality of annular magnets or magnet members provided by arc magnets connected in a ring so that center holes of the magnets or the magnet members are coaxially aligned to form a tube. The magnet 45 is accommodated inside a surface material of the rod 41.

The induction coil 46 is an annular member surrounding the outer circumference of the rod 41 and is supported at the center of the casing 42. A drive current corresponding to a moving direction and moving speed of the rod 41 is supplied to the induction coil 46 from an external control device (not shown), so that the magnet 45 and the induction coil 46 serve as the linear motor 44.

The induction coil 46, magnet 45, rod guides 43 and rod 41 are coaxially disposed, so that the thrust axis of the linear motor 44 and the moving axis of the rod 41 coincide and the drive force on the rod 41 (driving body) is symmetrically applied with respect to the moving axis (i.e. the moving direction of the rod 41).

The laser interferometer 5 is a displacement detector of the invention and includes an interferometer body 51 that houses basic elements such as a light-receiving element and a splitter. An external laser source 53 is connected to the interferometer body 51 via an optical fiber 52.

A laser beam window 54 of the interferometer body 51 is connected to the base of the rod 41 via a metallic bellows 55. Although a distance between the rod 41 and the interferometer body 51 fluctuates since the rod 41 moves forward and backward in the longitudinal direction as described above, the connection between the rod 41 and the interferometer body 51 is maintained by expansion and contraction of the bellows 55.

An inside of the bellows 55 and a hollow portion of the rod 41 intercommunicate with each other. Such a continuous space provides a laser path 56.

At the tip end of the rod 41, the hollow portion of the rod 41 is hermetically sealed by a cap 49. A mirror 57 with a reflection surface is fixed inside the cap 49.

Thus, a laser light radiated from the laser beam window 54 passes through the laser path 56 to reach the tip end of the rod 41 to be reflected by the mirror 57. Then, the reflected light passes through the laser path 56 to return to the interferometer body 51, where the laser light is received by the interferometer body 51.

In order to enhance measurement accuracy, an inner pressure of the laser path 56 is reduced to a high vacuum state. While being expansible and contractible in the longitudinal direction as the rod 41 moves, the bellows 55 securely has a predetermined rigidity in a radial direction by being made of metal. Accordingly, even if a difference between an internal air pressure and an external air pressure of the bellows 55 is large, the bellows 55 does not collapse.

According to the first exemplary embodiment, driving the rod 41 by the drive mechanism 4 enables moving of the table 31 through the rod 41 and the joint 6. The displacement of the table 31 is detected by the laser interferometer 5 (a displacement detector).

With the use of the linear motor 44, a high accuracy inherent in a linear motor mechanism can be provided to the drive mechanism 4. Further, since the linear motor 44 is disposed around the rod in tubular form, the thrust axis of the linear motor 44 can be matched with the moving axis of the rod 41. Thus, the offset error between the thrust axis and the moving axis can be eliminated, thereby enhancing the positioning accuracy of the table 31.

The laser interferometer 5 exhibits a high precision with the use of laser interference. In addition, since the laser interferometer 5 is provided with the laser path 56 penetrating the hollow portion of the rod 41, the laser interferometer 5 can align a moving axis of the rod 41 and a position-detecting axis of the laser light with the moving direction of the table 31, thereby avoiding an off-set error. Accordingly, a positioning accuracy for the table 31 can be improved.

Thus, according to the first exemplary embodiment, all of the detection axis of the laser interferometer 5, the thrust axis of the drive mechanism 4 and the moving axis of the rod 41 can be coaxially aligned, thereby providing the precision feeding device 9 and precision transfer equipment 1 that allow a highly precise movement and a highly precise positioning based on a highly precise position detection.

Second Exemplary Embodiment

Figure 3:
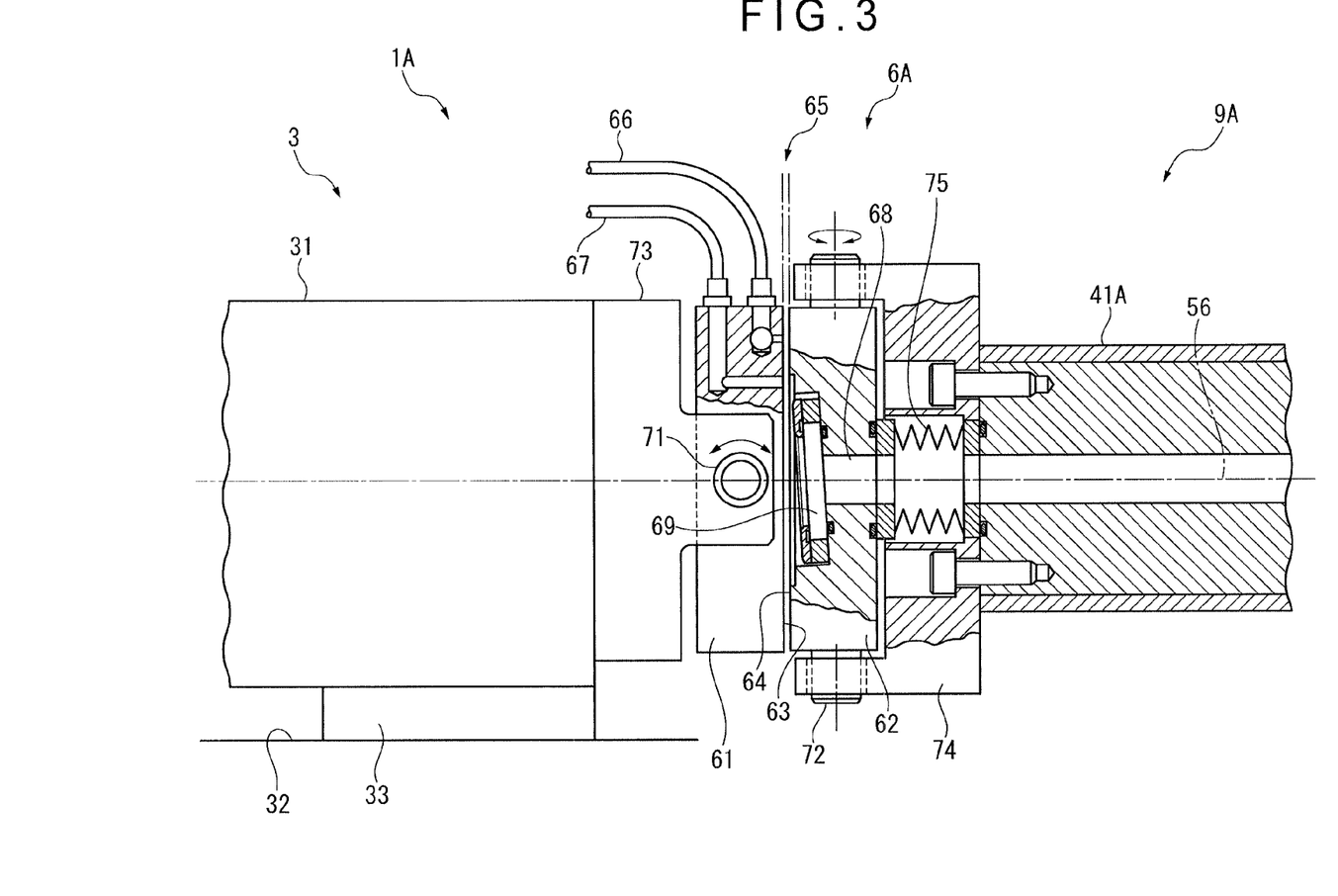
FIG. 3 is a cross-sectional view showing a relevant part according to the second exemplary embodiment.

FIGS. 2 and 3 show a second exemplary embodiment of the invention.

In FIG. 2, precision transfer equipment 1A according to the second exemplary embodiment includes: the base 2; and the table mechanism 3, the drive mechanism 4 and the laser interferometer 5 provided on the base 2. The drive mechanism 4 and the laser interferometer 5 provide a precision feeding device 9A of the invention.

The basic arrangements of the precision transfer equipment 1A and the precision feeding device 9A are the same as those of the precision transfer equipment 1 and the precision feeding device 9 of the above-described first exemplary embodiment. Accordingly, the same reference numerals will be used for the same components to avoid duplicated explanations.

As shown in FIG. 2, a rod 41A has no cap 49 as in the first exemplary embodiment at a tip end thereof but has an opening exposed to the laser path 56 penetrating the center of the rod 41A to be in communication with a central hole of the joint 6A.

In other words, in contrast to the "closed-end" rod 41 of the above-described first exemplary embodiment, the rod 41A of the second exemplary embodiment is "open-ended."

Further, though the joint 6 of the above-described first exemplary embodiment is isolated from the laser path 56 and can be provided in any joint structure, the joint 6A is provided in a supplying-discharging static-pressure joint including a reflection surface.

In FIG. 3, the joint 6A includes a movement member 61 that is connected to the table 31 and a drive member 62 that is connected to the tip end of the rod 41A.

The movement member 61 and the drive member 62 are made of metal in a disc. One surface of each of the movement member 61 and the drive member 62 is polished so as to provide a highly precise flat surface. With this polishing, a movement surface 63 is formed on the surface of the movement member 61 and a drive surface 64 is formed on the surface of the drive member 62.

The movement member 61 is supported by a support member 73 via a horizontal turn shaft 71. The support member 73 is fixed on a side of the table 31. With this arrangement, a gimbal mechanism is formed on a side of the movable body, which allows the movement member 61 and the movement surface 63 to be slidable in a pitching direction.

The drive member 62 is supported by a support member 74 via a vertical turn shaft 72. The support member 74 is fixed on the tip end of the rod 41A. With this arrangement, a gimbal mechanism is formed on a side of the driving body, which allows the drive member 62 and the drive surface 64 to be slidable in a yawing direction.

Each of the turn shafts 71 and 72 is a trunnion pin fixed respectively to the movement member 61 and the drive member 62 and is provided with bearing balls disposed in a V-groove surrounding an outer circumference of the trunnion pin. Thus, the turn shafts 71 and 72 provide a single-row deep-groove ball bearing on an inner circumference of receiving portions of the support members 73 and 74, thereby allowing free rotation around a center axis while restricting axial displacement.

These gimbal mechanisms reduce inclination between the rod 41A and the table 31 in pitching and yawing directions. Incidentally, vertical and horizontal displacements between the rod 41A and the table 31 are reduced by a below-described static-pressure clearance 65 of the joint 6A.

In the joint 6A, the movement member 61 and the drive member 62 are disposed to face each other and the static-pressure clearance 65 is formed between the movement surface 63 and the drive surface 64 with a later-described fluid.

Usually, the table 31 is movable in a predetermined moving direction and the rod 41A also extends in the moving direction and is driven to move forward and backward in the moving direction. The turn shaft of the movement member 61 and the turn shaft of the drive member 62 are orthogonal to each other. The movement surface 63 and the drive surface 64 are usually orthogonal to the above moving direction of the table 31. Even if the rod 41A is slightly inclined against the moving direction of the table 31, such an inclination is absorbed by the above gimbal mechanisms on the respective sides of the moving and driving bodies, so that the above movement surface 63 and the drive surface 64 are kept orthogonal to the moving direction of the table 31.

To the movement member 61, a fluid supply channel 66 and a fluid discharge channel 67 are connected, whereby fluid is supplied to and discharged from the static-pressure clearance 65.

A compressed (or pressurized) air which is guided by the fluid supply channel 66 is supplied to the static-pressure clearance 65 through fluid restrictors provided at plural positions near the periphery of the movement surface 63.

Through the fluid discharge channel 67 which is connected with a negative pressure source, air is discharged from an area inside an area where the air is supplied near the periphery of the movement surface 63.

With this arrangement, the air supplied near the periphery of the static-pressure clearance 65 from the fluid supply channel 66 is partially released toward the atmosphere from the periphery of the static-pressure clearance 65 while the air in the inside area is discharged from the fluid discharge channel 67.

Accordingly, the inside area where the air is discharged becomes a negative pressure area, which causes a tensile force to make the movement surface 63 and the drive surface 64 approach each other. The tensile force serves as preload as a static-pressure joint. In the air supply area near the periphery, a compression force is applied on an air layer having a certain thickness, thereby providing a supplying-discharging static-pressure joint.

A through hole 68 is formed at the center of the drive member 62.

A metallic bellows 75 is connected to the drive member 62 near the rod 41A, specifically, connected to the periphery of an opening of the laser path 56 provided at the tip end of the rod 41A.

With this arrangement, the laser path 56 inside the rod 41A, an inside of the bellows 75 and the through hole 68 intercommunicate with each other along the axis of the moving direction of the table 31.

A glass transparent plate 69 is provided in the through hole 68 near the drive surface 64 and hermetically seals the inside of the through hole 68, the bellows 75 and the laser path 56 from the static-pressure clearance 65. The transparent plate 69 is transmissive of laser light from the laser interferometer 5. The laser light arriving through the laser path 56 is transmitted through the transparent plate 69 and is reflected by the movement surface 63 to be again transmitted through the transparent plate 69 to return to the laser path 56, where the laser light is detected by the laser interferometer 5.

In this arrangement, since the movement surface 63 is kept orthogonal to the moving direction of the table 31 (i.e., an optical axis of the laser light passing through the laser path 56), the movement surface 63 can reliably reflect the laser light from the laser path 56.

On the other hand, when the transparent plate 69 is fixed in the through hole 68, the transparent plate 69 is not orthogonal to the moving direction of the table 31 (i.e., the optical axis of the laser light passing through the laser path 56), but the transparent plate 69 is fixed so as to be slightly angularly-inclined against the optical axis of the laser light. With this arrangement, any reflected components generated on the transparent plate 69 are deviated from the optical axis of the laser light and never return to the laser interferometer 5.

According to the second exemplary embodiment, the following advantages can be obtained as well as the same advantages as those of the first exemplary embodiment.

In the second exemplary embodiment, since the joint 6A is provided by a supplying-discharging static-pressure joint including gimbal mechanisms with orthogonal two axes, influences (e.g., vibration) generated in the drive mechanism 4 during a drive can be avoided and a highly precise movement can be conducted by driving only in the moving direction of the table 31.

Further, since the movement surface 63 is used as the reflection surface of the laser path 56, an independent mirror is not necessary. Further, since the light is reflected at a portion closer to the table 31 (movable body), the detection accuracy can be enhanced.

Further, since the drive surface 64 is provided with the transparent plate 69 that hermetically seals the laser path 56 penetrating from the inside of the rod 41A to the through hole 68 from the static-pressure clearance 65, the pressure in the laser path 56 can be set at a reduced pressure irrespective of the air pressure of the static-pressure clearance 65. Accordingly, even when the pressure of the static-pressure clearance 65 is high relative to the high vacuum required for the laser path 56, the fluid of the static-pressure clearance 65 can be kept from flowing into the laser path 56.

Since the transparent plate 69 is inclined against the optical axis of the laser light passing through the laser path 56, any unnecessary reflection light is not returned to the laser interferometer 5 in the measurement using the laser interferometer 5.

Third Exemplary Embodiment

Figure 4:
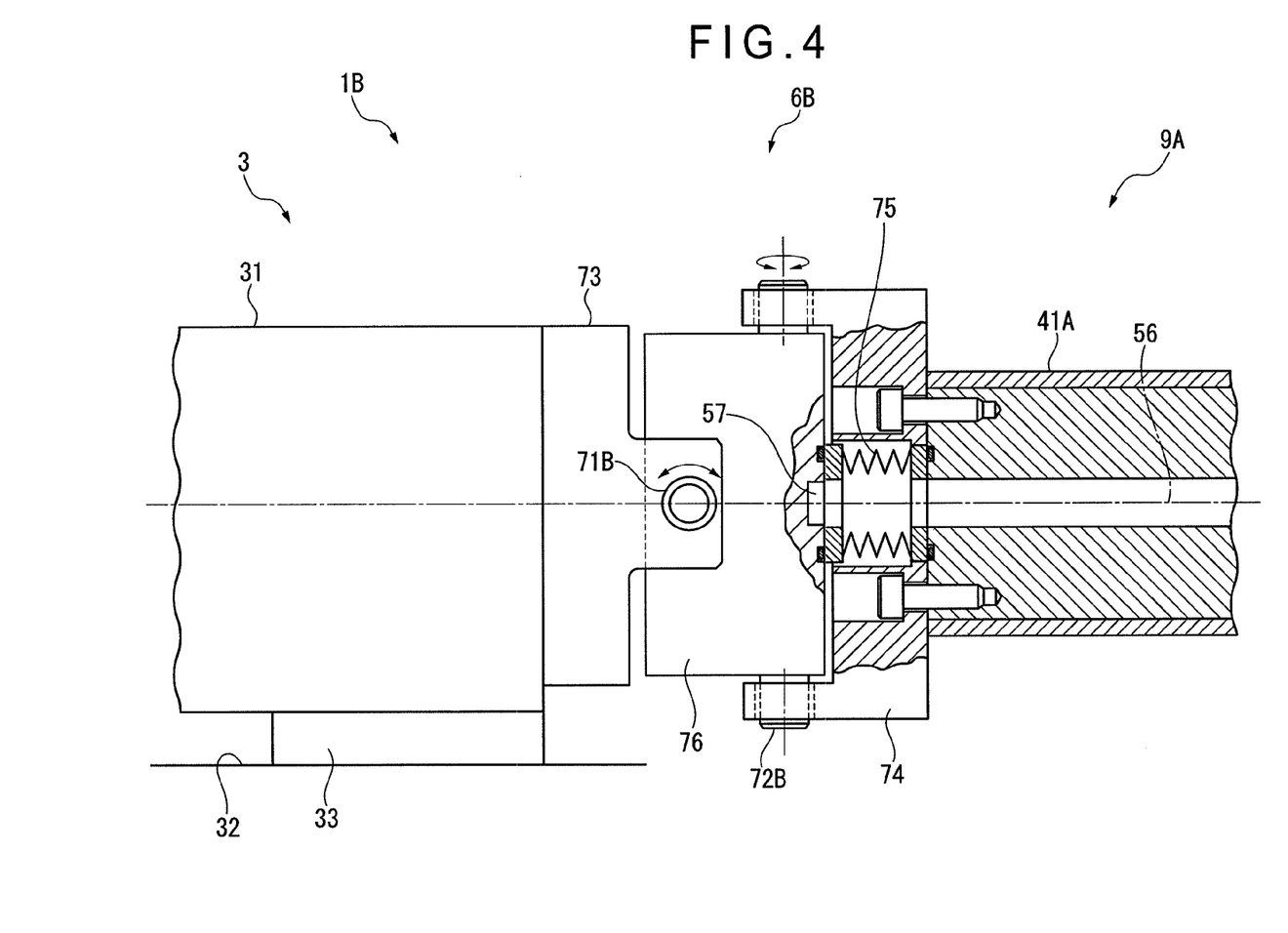
FIG. 4 is a cross-sectional view showing a relevant part according to a third exemplary embodiment of the invention.

FIG. 4 shows a third exemplary embodiment of the invention.

The basic arrangements of a precision transfer equipment 1B of the third exemplary embodiment are the same as those of the precision transfer equipment 1 of the above-described first exemplary embodiment. Accordingly, the same reference numerals will be used for the same components to avoid duplicated explanations.

The precision feeding device 9A in the precision transfer equipment 1B is the same as the precision feeding device 9 in the above-described first exemplary embodiment.

In this exemplary embodiment, in order to connect the precision feeding device 9A with the table mechanism 3, a joint 6B is used that includes a gimbal mechanism with orthogonal two axes but is not a supplying-discharging static-pressure joint.

As shown in FIG. 4, a support member 74 and a vertical turn shaft 72B similar to those in the second exemplary embodiment are fixed at an end of an open-ended rod 41A extending from the precision feeding device 9A. On the other hand, a support member 73 and a horizontal turn shaft 71B similar to those in the first exemplary embodiment is fixed on a side of the table 31.

In this exemplary embodiment, an intermediate member 76 is provided in place of the movement member 61 and the drive member 62 in the second exemplary embodiment. A side of the intermediate member 76 near the table 31 is connected to the horizontal turn shaft 71B in a rotatable manner and another side of the intermediate member 76 near the rod 41A is connected to the vertical turn shaft 72B in a rotatable manner.

Each of the turn shafts 71B and 72B is provided by a stroke bearing that is rotatable around a central axis thereof and allows movement along the central axis.

According to the second exemplary embodiment, the following advantages can be obtained as well as the same advantages as those of the second exemplary embodiment.

In the third exemplary embodiment, the joint 6B is provided with a horizontally rotatable moving-side gimbal mechanism and a vertically rotatable fixed-side gimbal mechanism respectively allowing a swing movement in a pitching direction and a swing movement in a yawing direction. Further, with the use of stroke bearings for the turn shafts 71B and 72B, the joint 6B is displaceable in vertical and horizontal directions orthogonal to the moving axis of the rod 41A. The vertical and horizontal displacements are effected by supplying-discharging static-pressure joints 6 and 6A in the first and second exemplary embodiments. In contrast, in the third exemplary embodiment, the turn shafts 71B and 72B with a stroke bearing are used for allowing the vertical and horizontal displacements.

With the above arrangement, even when a force is applied from the rod 41A to the table 31 in a direction not aligned in the moving axis, the transmission of such force can be reduced.

Fourth Exemplary Embodiment

Figure 5:
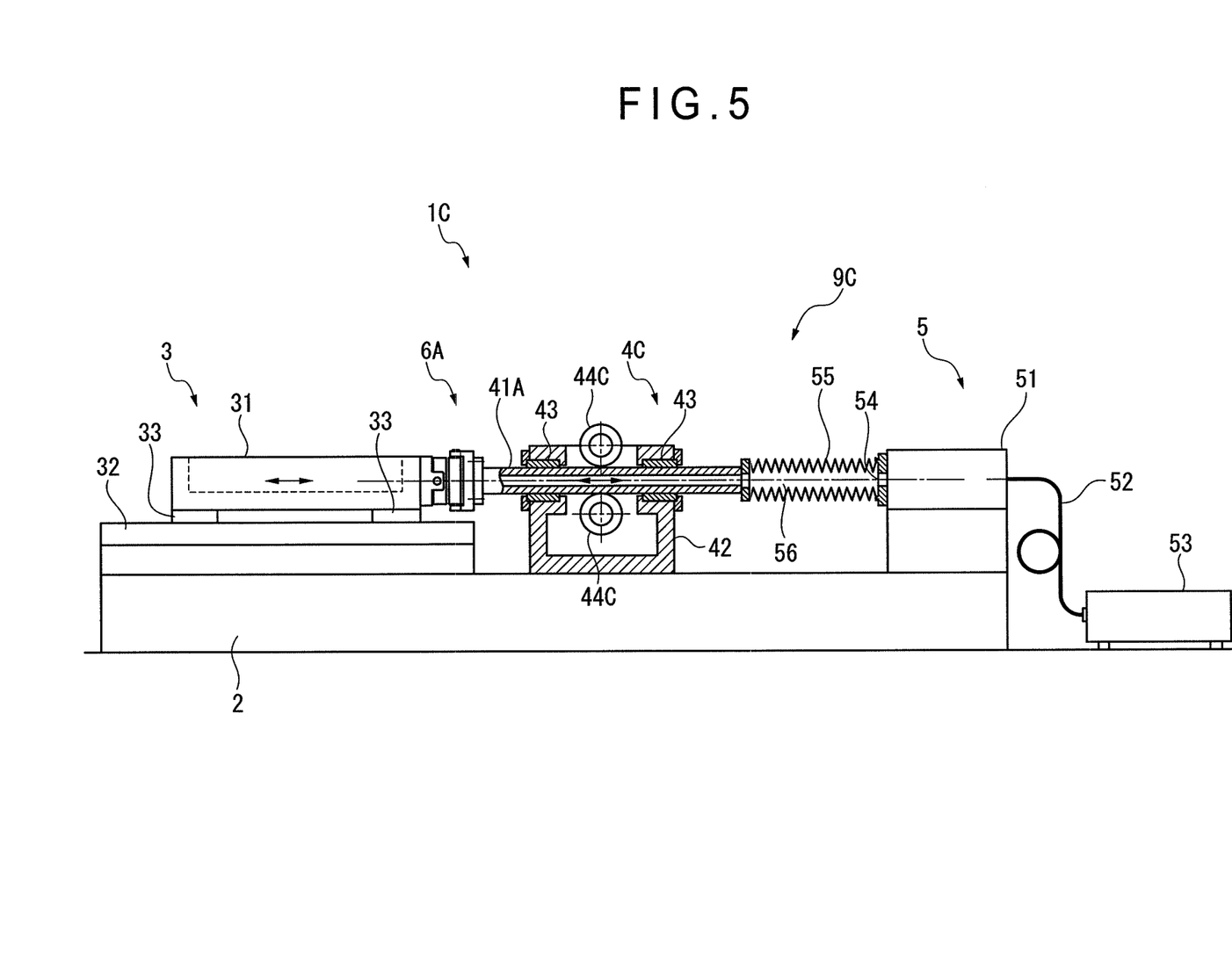
FIG. 5 is a schematic view showing an overall structure according to a fourth exemplary embodiment of the invention.

FIG. 5 shows a fourth exemplary embodiment of the invention.

In FIG. 5, precision transfer equipment 1C according to the fourth exemplary embodiment includes: the base 2; and the table mechanism 3, a drive mechanism 4C and the laser interferometer 5 provided on the base 2. The drive mechanism 4C and the laser interferometer 5 provide a precision feeding device 9C of the invention.

The basic arrangements of the precision transfer equipment 1C and the precision feeding device 9C are the same as those of the precision transfer equipment 1A and the precision feeding device 9A of the above-described second exemplary embodiment, in which the open-ended rod 41A and the joint 6A including a supplying-discharging static-pressure bearing with gimbal mechanisms are employed in the arrangement of the first exemplary embodiment. Accordingly, the same reference numerals will be used for the same components to omit duplicated explanations.

As shown in FIG. 5, the difference between the above-described second exemplary embodiment and the fourth exemplary embodiment is that the drive source of the drive mechanism 4C is not a linear motor.

The drive mechanism 4C includes the casing 42, the rod guide 43 and the drive roller 44C in order to drive the rod 41A.

In the drive mechanism 4C, the drive roller 44C includes a pair of drive rollers 44C with the rod 41A interposed therebetween in a manner that the pair of drive rollers 44C are symmetrical relative to the rod 41A. A rotary force from a power source such as an electric motor (not shown) is transmitted to the drive rollers 44C via a transmission mechanism, so that the pair of drive rollers 44C are capable of rotating at an equal speed to apply a symmetrical drive force on the rod 41A.

According to the fourth exemplary embodiment, though the drive force cannot be transmitted in a non-contact manner as in the linear motor 44 of the drive mechanism 4 in the above-described first exemplary embodiment, since the pair of drive rollers 44C oppositely disposed with the rod 41A being interposed are synchronously rotated, symmetrical drive force can be applied to the rod 41A and the moving axis of the rod 41A and the thrust axis of the drive mechanism 4C can be aligned in addition to aligning with the detection axis of the laser interferometer 5, so that high accuracy can be obtained.

Further, since the drive mechanism 4C is provided with the pair of drive rollers 44C, an extremely simple structure as compared to the drive mechanism 4 using the linear motor 44 as in the first exemplary embodiment is possible and equipment cost can be significantly reduced. Thus, by employing the arrangement of the fourth exemplary embodiment in accordance with intended use, sufficient accuracy due to alignment of respective axes can be obtained.

Modification(s)

The invention is not limited to the exemplary embodiments as described above, but may include any modification or improvement as long as an object of the invention can be achieved.

For instance, the linear motor 44 of the drive mechanism 4 may not be provided in a tube with the use of the annular magnet 45 and annular induction coil 46. Alternatively, the linear motor 44 may be provided by arranging a plurality of linear motor structures along the moving axis around the rod 41 or 41A, each of the linear motor structures including a magnet 45 and induction coil 46, to provide a tubular profile as a whole.

The drive mechanism 4C may not be provided by the pair of drive rollers 44C, but may be provided by two or more pairs of drive rollers 44C. For instance, in addition to the pair of vertically arranged drive rollers 44C, a pair of horizontally arranged drive rollers 44C may be provided. With the use of plural pairs of drive rollers 44C, the rod 41 can be supported by the drive rollers 44C, so that it is possible to omit one of the rod guides 43.

Instead of frictional rolling drive by the drive rollers 44C, other mechanism such as a feed screw may be used. For instance, feed screws may be juxtaposed on both sides of the rod 41 or 41A and thrust axes of the feed screws may be aligned with the moving axis.

The bellows 55 between the drive mechanism 4 and the laser interferometer 5 may be replaced by a telescopic structure and the like.

In the above exemplary embodiments, the moving direction of the table 31 is described in one dimension. However, the table 31 may be moved in two dimensions in combination of two drive systems.

What is claimed is:

1. A precision feeding device that drives a movable body in a predetermined moving direction, the movable body being supported by a base and movable in the moving direction, the precision feeding device comprising:
a hollow tubular driving body that is connected to the movable body and that extends in the moving direction;
a drive mechanism that drives to move the driving body forward and backward in the moving direction; and
a displacement detector that detects a displacement of the movable body relative to the base, wherein
the drive mechanism comprises a linear motor that symmetrically applies a drive force on the driving body relative to an axis of the driving body in the moving direction, the linear motor comprising a movable member provided on the driving body and having a thrust axis aligned with a movement axis of the driving body, and a stator provided in a form of a tube around the driving body, and
the displacement detector is a laser interferometer that has a laser path penetrating an interior of the driving body and extending in the moving direction to be aligned with the movement axis of the driving body and the thrust axis of the linear motor.

2. The precision feeding device according to claim 1, further comprising: a guide mechanism that supports the driving body so that the driving body is movable along the moving direction.

3. The precision feeding device according to claim 1, wherein the driving body includes a closed end near a connection with the movable body and a reflection surface orthogonal to the laser path inside the closed end.

4. The precision feeding device according to claim 1, further comprising:

a joint that connects the movable body and the driving body, wherein the joint is provided by a supplying-discharging static-pressure joint and comprises: a movement surface that is connected to the movable body in a manner orthogonal to the moving direction; a drive surface that is connected to the driving body in a manner to face the movement surface; a fluid supply channel that guides a pressurized fluid into a static-pressure clearance formed between the movement surface and the drive surface; and a fluid discharge channel that is connected with a negative pressure source and discharges the fluid from the static-pressure clearance, and a laser light going through the laser path passes through the driving body and the drive surface and is reflected by the movement surface.

5. A precision transfer equipment comprising:

a base;

a movable body that is supported by the base and is movable in a predetermined moving direction;

a hollow tubular driving body that is connected to the movable body and extends in the moving direction;

a drive mechanism that drives to move the driving body forward and backward in the moving direction; and a displacement detector that detects a displacement of the movable body relative to the base, wherein the drive mechanism comprises a linear motor that symmetrically applies a drive force to the driving body relative to an axis of the driving body in the moving direction, the linear motor comprising a movable member provided on the driving body and having a thrust axis aligned with a movement axis of the driving body, and a stator provided in a form of a tube around the driving body, and the displacement detector is a laser interferometer that comprises a laser path penetrating an interior of the driving body and extending in the moving direction to be aligned with the movement axis of the driving body and the thrust axis of the linear motor.

* * * * *